HIGH PASS FILTER

Filed April 4, 1951

Inventor
Raoul du Chatellier
by Mason, Kolehmainen, Rathburn & Wyss Attys

Jan. 29, 1957 R. DU CHATELLIER 2,779,924

HIGH PASS FILTER

Filed April 4, 1951 2 Sheets-Sheet 2

Inventor
Raoul du Chatellier by Mason, Kolehmainen, Rathburn & Wyss Attys 2,779,924

HIGH PASS FILTER

Raoul Du Chatellier, Chicago, Ill.

Application April 4, 1951, Serial No. 219,168
4 Claims. (Cl. 333—76)

The present invention relates to a high pass filter and more particularly to an improved tuned filter arrangement for use with television receivers so as to eliminate interference from radio transmitting equipment and other apparatus and to provide greatly improved picture reception.

At the present time in the United States television broadcasting is confined to two bands extending from 54 megacycles to 88 megacycles for the first band, and from 174 to 216 megacycles for the second band. These two bands are referred to generally as the low frequency and high frequency television bands respectively. Each band is divided into a plurality of channels six megacycles in width. The present channels and the frequency limits are as follows:

| Channel number: | Frequency limits, mc. |
|---|---|
| 2 | [1] 54–60 |
| 3 | [1] 60–66 |
| 4 | [1] 66–72 |
| 5 | [1] 76–82 |
| 6 | [1] 82–88 |

[1] Low frequency television band.

| Channel Number: | Frequency limits, mc. |
|---|---|
| 7 | [2] 174–180 |
| 8 | [2] 180–186 |
| 9 | [2] 186–192 |
| 10 | [2] 192–198 |
| 11 | [2] 198–204 |
| 12 | [2] 204–210 |
| 13 | [2] 210–216 |

[2] High frequency television band.

Most television receivers employ some sort of television antenna which conventionally is either connected to the television receiver by (1) a transmission line of either the 300 ohm or 72 ohm type or (2) a built-in loop style. The length of the transmission line between the antenna and the receiver for (1) above is dictated solely by the compulsory mounting positions for the antenna and the desired location of the receiver and hence the lengths vary widely. Where these lengths are greater or shorter than the technical requisites demanded by the frequency at which the television receiver is to operate, no compensation at television frequency is possible. Indoor antennas do not have adequate receptive properties nor radio interference eliminating capacities. They constitute a mismatch for the television front end circuit. Such mismatch is detrimental to good television reception and is expressed by what is known as "standing wave ratio." It would be desirable to provide an arrangement where an accurate match is possible to improve the standing wave ratio and hence provide good television reception.

The input of television receivers is broad band and hence is not selective enough to reject spurious voltages originating from transmitting equipment such as short wave radio and the like whose strong harmonics cause severe interference in television channels set forth above.

Such spurious signals which interfere with the television reception are undesirable and are not limited to amateur transmission which for the ten meter band for the United States ranges from 28.5 to 29.640 megacycles. This is the amateur signal that causes most interference. Other interference is caused by co-channel or adjacent channel signals, carrier beats, cross modulation and various noises originating in bands closely adjacent to the television bands such as diathermy, electrical appliances, police and civic radio transmitters as well as amateur transmitters already mentioned. Police radio is confined to a series of bands within the frequencies of the television channels. Also, ignition signals from internal combustion engines fall within the interfering range. In addition to that, there are low frequency signals caused by induction motors used with stokers and other units employed in homes of which various harmonics cause interference. A high standing wave ratio, which may indicate mismatch, reduces signal strength since if the signal is not fully absorbed by the input of the television receivers, it is reflected back out of phase along the transmission line. This is particularly true of 300 ohm ribbon type transmission lines in which the standing wave ratio increases in proportion with an incoming signal. The source of spurious or interfering signals is usually closer to the receiver than the source of the intelligence signal to be received by the television receiver. Moreover, the voltage produced by the spurious signal combines with the voltage produced by the intelligence signal and if the resultant is a spurious voltage, obviously the television reception will be unsatisfactory. Obviously, also, with an effectively weaker incoming signal, spurious voltages occurring from other transmitting equipment or noise will ride over the incoming signal and interfere with the video and audio stages of the television receiver.

It would be desirable, therefore, to provide a simple arrangement which could be employed with any television receiver to eliminate such spurious voltages and reduce the standing wave ratio thereby effectively increasing the signal strength and also reducing the effective noise which interferes with both the audio and video signals. It is, therefore, an object of the present invention to provide an improved arrangement for accomplishing this result.

It is another object of the present invention to provide an improved filter arrangement for both reducing the standing wave ratio and preventing spurious frequencies from affecting the operation of the television receiver.

It is another object of the present invention to provide an improved high pass filter which eliminates the number of free space non-resonant points due to untuned transmission lines generally produced by transmission lines of different heights and different lengths and moreover prevents spurious voltages from interfering with the signal strength at the allocated television channels.

Still another object of the present invention is to provide a filter having a shunting reactance effect which allows a maximum voltage to develop at the input of the receiver with respect to the desired signal thereby permitting maximum contrast and the brightest image on the television screen.

It is another object of the present invention to provide an improved filter readily applicable to any television installation which offers a voltage attenuation ratio at a cut off frequency at the lower end of the order of 50 megacycles thereby eliminating almost all of the noise and interference which is commonly present in television receivers.

Still another object of the present invention is an improved filter which has a very simple compact construction having a minimum number of components and arranged to eliminate service and adjustment whereby the filter may be installed by an unskilled person and similarly may be adjusted by an unskilled person.

It is another object of the present invention to provide an improved filter in which all components are properly grounded and mounted in a shielded case with no high voltage present on any element thereof and with no possibility of causing fire or lightning hazards.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which.

In general, the present invention comprises a filter unit mounted in a shielded case of ferromagnetic material such as a steel case with a plurality of input and output terminals extending from the case. Disposed between corresponding input and output terminals are electrical components arranged to provide a parallel resonance circuit tuned to resonance at a frequency to provide cut off at frequencies below 50 megacycles. Additional inductance and capacitance means are employed in a compensating circuit to stabilize the matching impedance and maintain the high "Q" value of the inductive coils in the parallel resonant circuit constant. This compensating circuit comprises a series resonant arrangement to reduce the standing wave ratio. Individual tuning of the parallel resonance circuits between the filter input and output terminals is also provided. Also, a matching transformer stub is employed between the filter proper and the television receiver.

Figure 2:
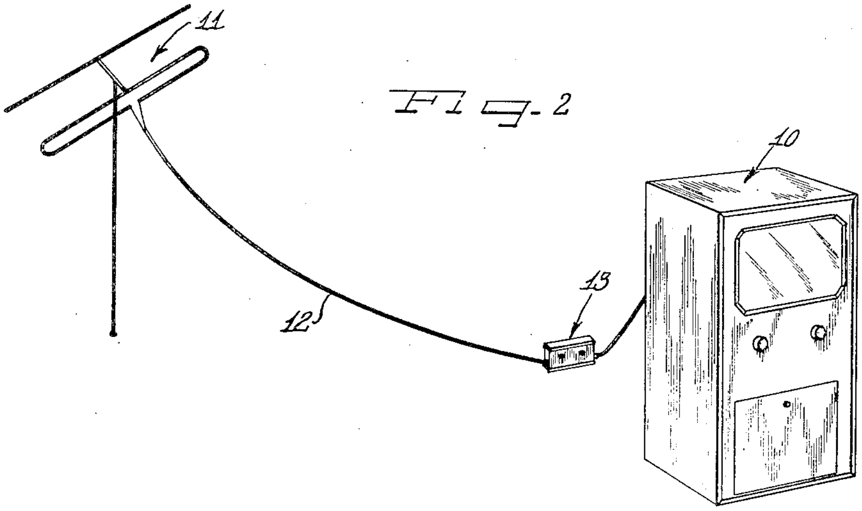
Fig. 2 is a schematic diagram showing the television installation with the filter applied thereto.

Referring now to Fig. 2 of the drawings, there is illustrated a television receiver generally designated at 10 which is associated with a conventional antenna generally designated at 11, the antenna being connected to the receiver 10 by means of a conventional transmission line 12 which may be of the well known 300 ohm ribbon type or the 72 ohm coaxial cable type. When such television units are installed, the installation people normally have a fixed number of feet of transmission line attached to the antenna and this is cut at random to the length required for the particular installation involved. In any case, a mismatch occurs between the antenna proper and the front end of the television set due to the additional fact that broad band antennas are used. In accordance with the present invention, there is provided a filter generally designated at 13 and described in detail hereinafter to provide impedance matching between the antenna and the front end of the television set.

Figure 1:
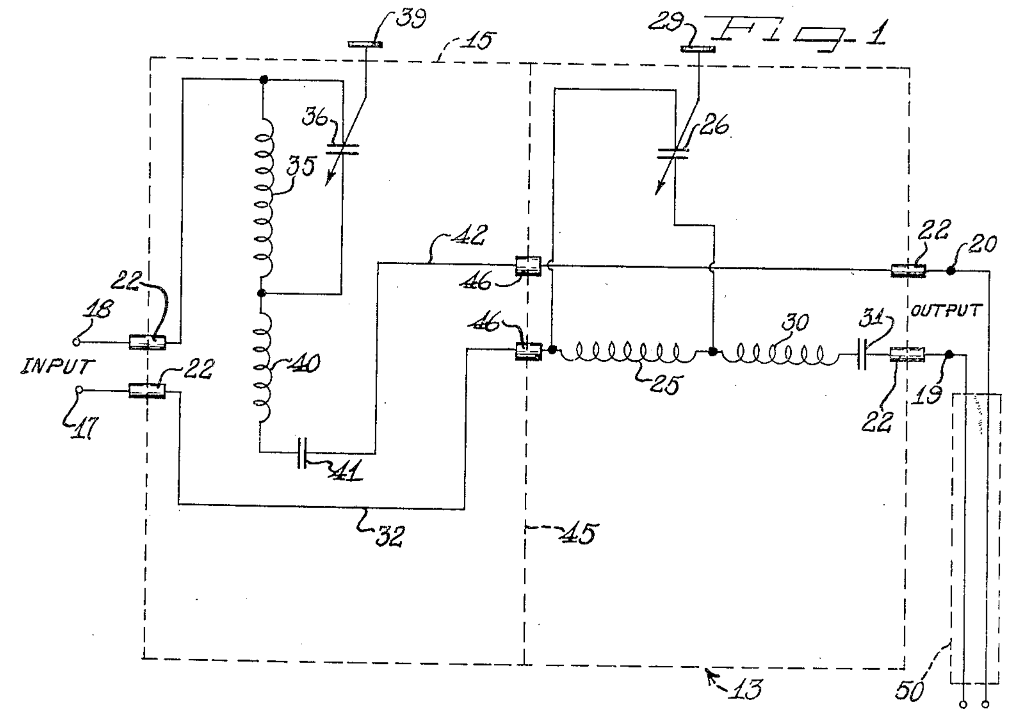
Fig. 1 is a schematic diagram of the circuit of the filter of the present invention showing in schematic form the structural elements associated therewith.
Figure 3:
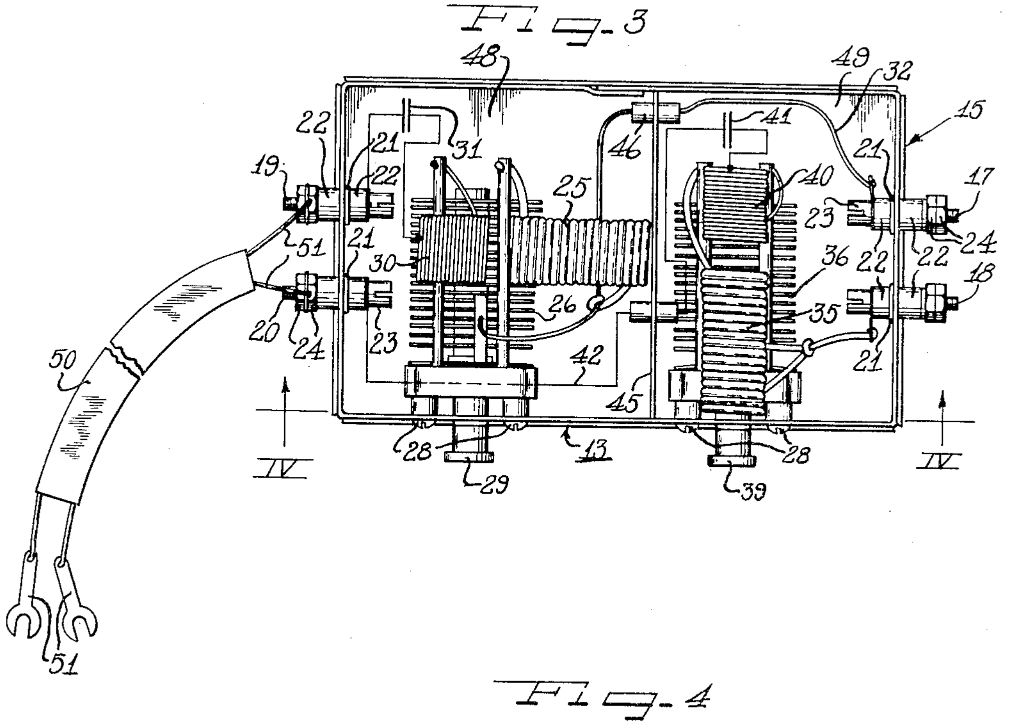
Fig. 3 is a structural view of the filter of the present invention with portions of the casing cut away in order to show the parts thereof.
Figure 4:
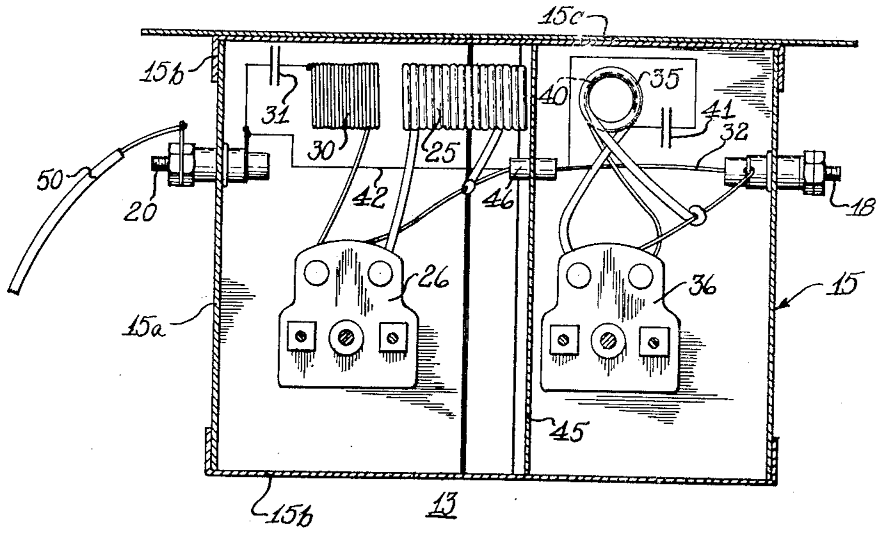
Fig. 4 is a sectional view taken on line 4—4 of Fig. 3, assuming that Fig. 3 shows the complete structure.

Referring now to Figs. 1, 3 and 4 of the drawings, the filter 13 of the present invention comprises a shield housing or container generally designated at 15 which has been specifically illustrated as a rectangular housing formed of metal and preferably a ferromagnetic metal such as steel. Such a housing may be made from suitable sheet metal stampings including a rectangular body portion 15*a*, upper and lower cover members 15*b* which may be identical, and a mounting flange member 15*c* which may be suitably spot welded or otherwise secured to one of the cover members 15*b*. The housing is relatively small so that it may readily be mounted at the rear of the television receiver or when initially installed in the factory may be mounted within the television receiver with the tuning controls thereof protruding for ready access thereto. In a particular embodiment built in accordance with the present invention, such a housing had dimensions of the order of 2½" x 4½" x 3¼". The casing size is important to insure constant Q.

In view of the fact that the filter of the present invention is arranged for connection between the input to the television receiver and the transmission line leading to the antenna, the filter unit 13 of the present invention is provided with a pair of input terminals designated as 17 and 18 and a pair of output terminals 19 and 20, the input terminals 17 and 18 being connected to the transmission line 12 and the output terminals 19 and 20 being adapted for connection to the receiver 10 through the matching transformer stub effectively forming an integral part of the present invention. In accordance with the present invention, the input terminals are suitably supported from the ends of the shield 15 and include low loss insulators for insulating the respective terminals from the shield 15. These low loss insulators are preferably formed of a ceramic material such as porcelain or one of the well known low loss insulators such as polyethylene or polystyrene. When other types of insulators such as mica, for example, are used, a substantial attenuation of the signal occurs and it is for this reason that it is important that the filter of the present invention employ one of the low loss insulators.

As illustrated, each of the terminals such as 17, 18, 19 and 20 comprises the central conductor portion thereof and a suitable insulating grommet 21 inserted within an opening defined in the casing or shield ends to insulate the conductor portion from the casing. Ceramic or other low loss insulated cylindrical members 22 are then disposed on either side of the housing wall for each terminal. The conductor portion of each terminal preferably includes a slotted head 23 to hold the same with a screwdriver or the like while the fastening screws 24 for attaching the conductors to the terminals may be suitably tightened.

In accordance with the present invention, there is disposed within the housing 15 a separate circuit between the terminals 17 and 19 and another almost identical separate circuit between the terminals 18 and 20. Except for the orientation thereof, these circuits are almost identical and hence the circuit between the terminals 17 and 19 will first be described. This circuit comprises a parallel resonant circuit including an inductance 25 and a variable capacitor 26 connected in parallel with the inductance 25. As illustrated, the variable capacitor 26 may comprise a conventional variable capacitor including a plurality of spaced stationary plates and a rotatable portion to vary the total capacitance thereof. Such variable capacitors can be purchased on the market as standard units and as illustrated in the drawings, the capacitor 26 is supported from one of the walls of the shield can 15 as by suitable fastening screws 28 with the adjustable control knob 29 for varying the capacitance thereof disposed outside the housing. Serially connected with the parallel resonant circuit comprising the inductance 25 and the capacitor 26 is an inductance 30 and a capacitor 31, the capacitor 31 being connected to the terminal 19. This circuit provides an electrical path between the terminals 17 and 19 and a suitable conductor 32 is provided between the terminal 17 and the terminal of the inductance 25, not connected to the inductance 30. Effectively, there is provided between the terminals 17 and 19 both a series resonant and a parallel resonant circuit.

Between the terminals 18 and 20, there is provided a substantially identical circuit to that already described, including an inductance 35 identical with the inductance 25 and a variable capacitor 36 identical with the capacitor 26. This capacitor 26 is also mounted to one of the walls of the shield can 15 as by fastening means 28 and has a control knob 39 extending outside the can to permit ready adjustment of the capacitance. The circuit between terminals 18 and 20 additionally includes the inductance 40 and capacitance 41 serially connected with one another and with the parallel resonant circuit comprising the elements 35 and 36. A suitable conductor 42 connects the capacitor 41 with the terminal 20.

In order that the electrical components in each of the two circuits just described between the input and output terminals of the filter 13 are electrically shielded from one another, the elements 25, 26, 30 and 31 are disposed in one portion of the housing while the corresponding elements 35, 36, 40 and 41 are disposed in another portion of the housing or shield or can 15 which portions are separated by a partition 45 in the form of a suitable separator such as a copper sheet or the like. Where the conductors 32 and 42 pass through the shield 45, suitable insulators such as 46 may be provided if desired or insulating conductors may be employed which pass through openings in the shield member 45.

In accordance with the present invention, the inductance elements 25 and 30 disposed in one section designated as 48 of the housing 15 have their longitudinal axes displaced by an angle of 90 degrees with the corresponding axes of the inductances 35 and 40 in the housing section 49 of the shield can 15. With this arrangement no inductive pick-up occurs between the inductances on the housing sections 48 and 49.

Although it will be understood that the various electrical components described above may have numerous values, in a filter constructed in accordance with the present invention, which operated very satisfactorily, the inductances 25 and 35 each comprised 17 juxtoposed turns of enameled copper wire number 18 gauge wound in a single-layer coil as best illustrated in Fig. 3, and having a one-half inch outer diameter so as to provide an inductance of one-half microhenry. The inductances 30 and 40 each comprises seventeen juxtaposed turns of 24 gauge enameled copper wire wound in a single-layer coil as best illustrated in Fig. 3, and having a one-half inch outer diameter thereby providing an approximate calculated inductance of .18 microhenry. The capacitors 31 and 41 employed were fixed mica-condensers of 50 mmf. each. The variable capacitors 26 and 36 were 100 mmf. variable condensers preferably set in the neighborhood of 67 mmf. With the parameters indicated above, the parallel resonant circuits, assuming that the capacitors 26 and 36 are set at approximately 67 mmf., will resonate at approximately 28 megacycles and the series resonant circuits will resonate at approximately 54 megacycles. Hence, the parallel variable resonance circuits are tuned to a frequency in the attenuated band and the series resonant circuits are tuned to a frequency in the television band.

For the purpose of insuring a proper match between the antenna and the receiver, the filter 13 of the present invention incorporates a 300 ohm matching transformer between the output terminals 19 and 20 of the filter and the input circuit of the television receiver. As illustrated, this matching transformer comprises a length of 300 ohm transmission line specifically designated by the reference numeral 50 which transmission line has a length related to a wave length of one of the frequencies in the attenuated band and in a specific embodiment comprised a six inch length with copper lugs 51 at each end for making electrical connections to the filter 13 and the television receiver 10. Actually, the six-inch transmission line is equivalent to a wave length of a 1040 megacycle frequency and therefore the transmission line is equal to 1/32 of the wave length corresponding to the 32.2 megacycle frequency.

The tuned circuits of the present invention provided in each line of the television receiver are high Q circuits which produce attenuation spots. However, the transmission line transforms the high impedance to a low impedance resistive load which matches more closely the input impedance of the receiver.

In view of the detailed description included above, the operation of the filter of the present invention will be readily understood by those skilled in the art. The parallel resonant filter units are each properly tuned by adjustment of the control knobs 29 and 39 so as to provide an effective signal cut off for signals having a frequency below 50 megacycles thereby effectively eliminating the range of interference so common to television receivers. It is believed that matching transformer portion 50 of the filter 13 of the present invention transforms impedance, which changes with frequency, to a specified resistance that remains constant irrespective of the frequency of the signal involved thereby improving the impedance band width of the television receiving antenna. The appropriate matching transformer 50 and the tunable circuits provide excellent results with the matching transformer transforming the load impedance into a constant resistance at all frequencies below 50 megacycles. The mismatch between the transmission line and the front end of the television set is eliminated and consequently the standing wave ratio is greatly reduced with a result that the maximum signal is received at the receiver.

It will, moreover, be apparent that a very simple mechanical construction is involved which will give long years of fool-proof service and no question of great expense of installation or the requirement of high trained technicians to apply the same to a receiver is involved. Anyone can install the filter and by means of simple adjustments of the adjusting knobs 29 and 39 can obtain maximum satisfaction. Extensive tests have demonstrated that the filter 13 of the present invention eliminates all sorts of interference caused by co-channel or adjacent channel, carrier beats, cross modulation, noises originating in the band affecting television receivers such as diathermy, police and civic radio transmitters, amateur transmitters, electrical appliances, etc. Furthermore, the filter 13 of the present invention has all components thereof properly grounded and mounted within a steel shield can or casing and no circuits carry high voltages so that hazard with respect to fire and lightning are completely eliminated.

While there has been illustrated and described a specific embodiment of the present invention, it will be understood that various changes and modifications will occur to those skilled in the art, and it is aimed in the appended claims to cover all such changes and modifications as fall within the true spirit and scope of the present invention.

What is claimed as new and desired to be secured by Letters Patent of the United States is:

1. An input filter for eliminating interference by attenuating all frequencies below the television band from the input signals supplied to a television receiver comprising a conductive housing, shielding means dividing said housing into two compartments, pairs of input and output terminals carried by said housing and insulated therefrom, means including a pair of inductors and a pair of capacitors disposed in a first of said compartments forming a parallel variable resonant circuit tuned to a variable first frequency in the attenuation band and a series resonant circuit tuned to a second frequency in the television band connected in series between one of said input terminals and one of said output terminals, means including another pair of inductors and another pair of capacitors disposed in the second of said compartments forming a parallel variable resonant circuit tuned to said variable first frequency in the attenuation band and a series resonant circuit tuned to said second frequency in the television band connected in series betwen the other of said input terminals and the other of said output terminals, the inductors in said first compartment being positioned perpendicular to the inductors in said second compartment to minimize coupling therebetween, and means including a section of transmission line interposed between said output terminals and the input terminals of the receiver to transform the output impedance of said circuits to a substantially constant resistance thereby to match the impedances of the receiver and said resonant circuits at all frequencies.

2. The combination set forth in claim 1 in which the capacitors of each of the parallel resonant circuits are variable by control means accessible from the exterior of said housing in order to vary the frequency to which said parallel resonant circuits are tuned.

3. A television input filter for attenuating all frequencies below the television band intercepted by an antenna of a television receiver comprising a housing, means including shielding means for separating said housing into two compartments electromagnetically isolated one from the other, a pair of input and a pair of output terminals fixedly secured and insulated from said housing, a first parallel variable resonant circuit selectively tuned to a first frequency in the attenuated band including an inductor and a variable capacitor and a first series resonant circuit tuned to a second frequency in the television band disposed within a first of said compartments and connected between one of said input and output terminals, a second parallel variable resonant circuit selectively tuned to said variable first frequency in the attenuated band including an inductor and variable capacitor and a second series resonant circuit tuned to said second frequency in the television band including an inductor and a capacitor disposed within a second of said compartments and connected between the other of said input and output terminals, the inductors of the first parallel and series resonant circuits being disposed perpendicularly to the inductors of the second parallel and series resonant circuits in order to maintain coupling therebetween at a nominal value, and a matching transformer including a transmission line having a length related to a wave length of one of the frequencies in the attenuated band electrically connected between said output terminals and the input terminals of said television receiver to match the input impedance of the television receiver with the output impedance of the resonant circuits at all frequencies.

4. A television input filter for attenuating all frequencies below the television band intercepted by an antenna of a television receiver comprising a housing, means including shielding means for separating said housing into two compartments electromagnetically isolated one from the other, a pair of input and a pair of output terminals fixedly secured and insulated from said housing, a first parallel variable resonant circuit selectively tuned to a first frequency in the attenuated band including an inductor and variable capacitor and a first series resonant circuit tuned to a second frequency in the television band disposed within a first of said compartments and connected between one of said input and output terminals, a second parallel variable resonant circuit selectively tuned to said variable first frequency in the attenuated band including an inductor and variable capacitor and a second series resonant circuit tuned to said second frequency in the television band including an inductor and a capacitor disposed within a second of said compartments and connected between the other of said input and output terminals, the inductors of the first parallel and series resonant circuits being disposed perpendicularly to the inductors of the second parallel and series resonant circuits in order to maintain coupling therebetween at a nominal value, and a matching transformer including a transmission line having a six-inch length connected between said output terminals and the input terminals of said television receiver to match the input impedance of the television receiver with the output impedance of the resonant circuits at all frequencies.

References Cited in the file of this patent

UNITED STATES PATENTS

| | | |
|---|---|---|
| 1,654,071 | De Monte et al. | Dec. 27, 1927 |
| 1,694,895 | Taylor et al. | Dec. 11, 1928 |
| 1,933,668 | Gilman | Nov. 7, 1933 |
| 1,962,910 | Rives | June 12, 1934 |
| 1,963,723 | Sterba | June 19, 1934 |
| 1,978,098 | Alexander et al. | Oct. 23, 1934 |
| 1,985,042 | Lane | Dec. 18, 1934 |
| 2,014,521 | Casper | Sept. 17, 1935 |
| 2,082,096 | Brown | June 1, 1937 |
| 2,270,416 | Cork et al. | Jan. 20, 1942 |
| 2,373,458 | Clark | Apr. 10, 1945 |

OTHER REFERENCES

Hills: QST, vol. 32, No. 10, October 1948, p. 132.